(12) United States Patent
Curtokar et al.

(10) Patent No.: US 11,663,071 B2
(45) Date of Patent: *May 30, 2023

(54) INSTINCTIVE SLITHER APPLICATION ASSESSMENT ENGINE

(71) Applicant: Bank of America Corporation, Charlotte, NC (US)

(72) Inventors: Sharvari Pratik Curtokar, Mumbai (IN); Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/728,046

(22) Filed: Apr. 25, 2022

(65) Prior Publication Data
US 2022/0350689 A1    Nov. 3, 2022

Related U.S. Application Data

(63) Continuation of application No. 17/243,830, filed on Apr. 29, 2021, now Pat. No. 11,347,579.

(51) Int. Cl.
*G06F 11/00* (2006.01)
*G06F 11/07* (2006.01)

(52) U.S. Cl.
CPC ........ *G06F 11/079* (2013.01); *G06F 11/0751* (2013.01); *G06F 11/0769* (2013.01)

(58) Field of Classification Search
CPC . G06F 11/079; G06F 11/0751; G06F 11/0769
USPC ...................................................... 714/1–57
See application file for complete search history.

(56) References Cited

U.S. PATENT DOCUMENTS

| | | |
|---|---|---|
| 6,263,364 B1 | 7/2001 | Najork et al. |
| 6,296,330 B1 | 10/2001 | Hall |
| 6,301,614 B1 | 10/2001 | Najork et al. |
| 6,321,265 B1 | 11/2001 | Najork et al. |

(Continued)

OTHER PUBLICATIONS

Nov. 9, 2021—(US) Office Action—U.S. Appl. No. 17/243,830.

(Continued)

*Primary Examiner* — Sarai E Butler
(74) *Attorney, Agent, or Firm* — Banner & Witcoff, Ltd.

(57) ABSTRACT

Aspects of the disclosure relate to application assessment. A computing platform may receive content information and manual input data corresponding to hierarchical content. The computing platform may establish a content tree indicating relationships between pages of the hierarchical content. The computing platform may receive starting/ending pages of the hierarchical content and application assessment commands. Using the content tree and in response to receipt of the application assessment commands, the computing platform may generate error information based on the starting page and the ending page by performing a holistic error analysis of the hierarchical content between the starting page and the ending page, which may include automatically populating manual input fields using the manual input data. The computing platform may send the error information and commands to display an error notification based on the error information, which may cause the administrator computing device to display the error notification.

20 Claims, 8 Drawing Sheets

(56) References Cited

U.S. PATENT DOCUMENTS

| | | | |
|---|---|---|---|
| 6,341,310 B1* | 1/2002 | Leshem | G06Q 30/02 714/E11.181 |
| 6,351,755 B1 | 2/2002 | Najork et al. | |
| 6,377,984 B1 | 4/2002 | Najork et al. | |
| 6,411,952 B1 | 6/2002 | Bharat et al. | |
| 6,751,612 B1 | 6/2004 | Schuetze et al. | |
| 6,952,730 B1 | 10/2005 | Najork et al. | |
| 6,988,100 B2 | 1/2006 | Jackson et al. | |
| 7,308,643 B1 | 12/2007 | Zhu et al. | |
| 7,454,410 B2 | 11/2008 | Squillante et al. | |
| 7,627,613 B1 | 12/2009 | Dulitz et al. | |
| 7,676,553 B1 | 3/2010 | Laucius et al. | |
| 7,769,742 B1 | 8/2010 | Brawer et al. | |
| 7,801,881 B1 | 9/2010 | Brawer et al. | |
| 7,984,054 B2 | 7/2011 | Dulitz et al. | |
| 8,037,054 B2 | 10/2011 | Brawer et al. | |
| 8,037,055 B2 | 10/2011 | Brawer et al. | |
| 8,260,781 B2 | 9/2012 | Dulitz et al. | |
| 8,417,686 B2 | 4/2013 | Brawer et al. | |
| 8,484,548 B1 | 7/2013 | Zhu et al. | |
| 8,538,949 B2 | 9/2013 | Liu et al. | |
| 8,612,420 B2 | 12/2013 | Sun et al. | |
| 8,762,705 B2 | 6/2014 | He | |
| 8,799,262 B2 | 8/2014 | Paduroiu | |
| 9,002,819 B2 | 4/2015 | Brawer et al. | |
| 9,015,144 B2 | 4/2015 | Sun et al. | |
| 9,015,478 B2 | 4/2015 | He | |
| 9,082,126 B2 | 7/2015 | Nielsen et al. | |
| 9,203,863 B2 | 12/2015 | He | |
| 9,239,881 B2 | 1/2016 | Liu et al. | |
| 9,305,091 B2 | 4/2016 | Zhu et al. | |
| 9,330,179 B2 | 5/2016 | Sun et al. | |
| 9,355,177 B2 | 5/2016 | Brawer et al. | |
| 9,524,343 B2 | 12/2016 | Liu et al. | |
| 9,652,538 B2 | 5/2017 | Shivaswamy et al. | |
| 10,210,256 B2 | 2/2019 | Zhu et al. | |
| 10,740,860 B2 | 8/2020 | Baldini Soares et al. | |
| 10,820,265 B2* | 10/2020 | Schneider | H04W 4/60 |
| 2005/0165889 A1 | 7/2005 | Muret et al. | |
| 2005/0216442 A1 | 9/2005 | Liskov et al. | |
| 2007/0266349 A1* | 11/2007 | Craig | G01R 31/318385 714/33 |
| 2007/0275705 A1 | 11/2007 | Lau et al. | |
| 2007/0294594 A1* | 12/2007 | King | G06F 11/32 714/46 |
| 2010/0011254 A1* | 1/2010 | Votta | G06F 11/008 714/47.2 |
| 2013/0246609 A1* | 9/2013 | Topchy | G06F 16/957 709/224 |
| 2013/0290824 A1* | 10/2013 | Lukawski | G06F 3/04842 715/222 |
| 2016/0378645 A1 | 12/2016 | Giuliani et al. | |
| 2017/0053037 A1* | 2/2017 | Luna | G06F 16/9535 |
| 2019/0392488 A1 | 12/2019 | Choi et al. | |
| 2021/0312474 A1 | 10/2021 | Yu et al. | |
| 2022/0012143 A1* | 1/2022 | Meeran | G06F 11/0751 |

OTHER PUBLICATIONS

Jiajia Jiao, "HEAP: A Hollistic Error Assessment Framework for Multiple Approximations Using Probabillisic Graphical Models" Feb. 22, 2020 (Year: 2020).

* cited by examiner

405

Test Initiation Interface

Please enter start and end directories to run a diagnostic test:

(Enter Start Here)    (Enter End Here)

Error Interface

An error has been identified in the link between page #1 and page #2.

FIG. 5

INSTINCTIVE SLITHER APPLICATION ASSESSMENT ENGINE

CROSS REFERENCE TO RELATED APPLICATIONS

This application is a continuation of and claims priority to co-pending U.S. application Ser. No. 17/243,830, filed Apr. 29, 2021, and entitled "Instinctive Slither Application Assessment Engine," which is incorporated herein by reference in its entirety.

BACKGROUND

Aspects of the disclosure relate to assessing web pages and applications. In particular, one or more aspects of the disclosure relate to computing platforms that maintain information about hierarchical content.

In some cases, enterprise organizations may assess functionality and/or operation of websites/applications using manual test mechanisms. Additionally or alternatively, automated test mechanisms may be used. However, even in these instances, test scenarios must be manually written and configured in an automated testing tool. In some instances, these approaches may be error prone as a result of incorrect application configuration and/or test data changes. Accordingly, such organizations may expend a significant amount of time and effort in application/website assessment, and the assessment may nevertheless be error prone.

SUMMARY

Aspects of the disclosure provide effective, efficient, scalable, and convenient technical solutions that address and overcome the technical problems associated with application assessment. In accordance with one or more embodiments of the disclosure, a computing platform comprising at least one processor, a communication interface, and memory storing computer-readable instructions may receive, from a web server and while a user device is accessing hierarchical content, content information and manual input data corresponding to the hierarchical content. The computing platform may establish, using the content information, a content tree indicating relationships between pages of the hierarchical content. The computing platform may receive, from an administrator computing device: 1) a starting page of the hierarchical content, 2) an ending page of the hierarchical content, and 3) one or more application assessment commands. Using the content tree and in response to receipt of the one or more application assessment commands, the computing platform may generate error information based on the starting page and the ending page, wherein generating the error information comprises performing a holistic error analysis of the hierarchical content between the starting page and the ending page, where performing the holistic error analysis of the hierarchical content between the starting page and the ending page includes automatically populating one or more manual input fields using the manual input data. The computing platform may send, to the administrator computing device, the error information and one or more commands to display an error notification based on the error information, which may cause the administrator computing device to display the error notification.

In one or more instances, performing a holistic error analysis of the hierarchical content between the starting page and the ending page may be further in response to receipt of a particular value, generated by and received from a range based random value generator. In one or more instances, establishing the content tree may include establishing multiple versions of the content tree, where each of the multiple versions of the content tree corresponds to a particular type of device.

In one or more embodiments, establishing the content tree may include establishing multiple versions of the content tree, where each of the multiple versions of the content tree corresponds to a particular region. In one or more instances, establishing the content tree may include establishing multiple versions of the content tree, where each of the multiple versions of the content tree corresponds to a particular country.

In one or more instances, the hierarchical content may be a web page. In one or more instances, the hierarchical content may be a mobile application.

In one or more embodiments, the computing platform may perform the holistic error analysis by identifying whether or not links between parent and child pages of the hierarchical content are correctly established. In one or more instances, the computing platform may perform the holistic error analysis by analyzing, without receiving additional application assessment commands and after analyzing the hierarchical content between the starting page and the ending page, remaining parent child relationships comprising the hierarchical content.

In one or more instances, the holistic error analysis may be performed without executing manually generated test scripts and without affecting a user experience associated with accessing the hierarchical content. These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4 and 5 depict illustrative graphical user interfaces for implementing a content tree for application assessment in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to an instinctive slither application assessment engine. For example, in some instances, manual test mechanisms may be relied on to assess the functionality and operation efficiency of an application. Even automated test mechanisms may depend on engineers to manually write test scenarios and configure them in an automated testing tool.

This approach may be prone to failures with regard to application flow, configuration, and/or test data changes. A technology that would eliminate the need for an engineer to manually write test scenarios and/or manually configure automated test tools may save a large amount of effort, time, and complexity. Further, it may reduce application deployment time and availability time significantly.

Accordingly, described herein is an instinctive slither application assessment engine, which may follow parallel imperceptible execution mechanisms, and may automatically scan and assess all the navigational points in an application, create a parent child relationship/tree of all navigation points, and save it for future reference. This engine might not require any manual intervention to capture these navigation points. It may be plugged on the browser or over a mobile application and may assess all navigation points itself.

If there are changes to an application, the engine may assess periodically and automatically update the navigation tree. The engine may maintain navigational information for the complete application and eliminate the need for an engineer to manually define navigation points and test scenarios for manual or automated application assessment.

The engine may be able to integrate with any test automation tool, and may be able to provide a next set of navigation points based upon the target state. For user input data on the application, the engine may be equipped to learn about the data from past inputs or available test data tools.

Figure 1A:
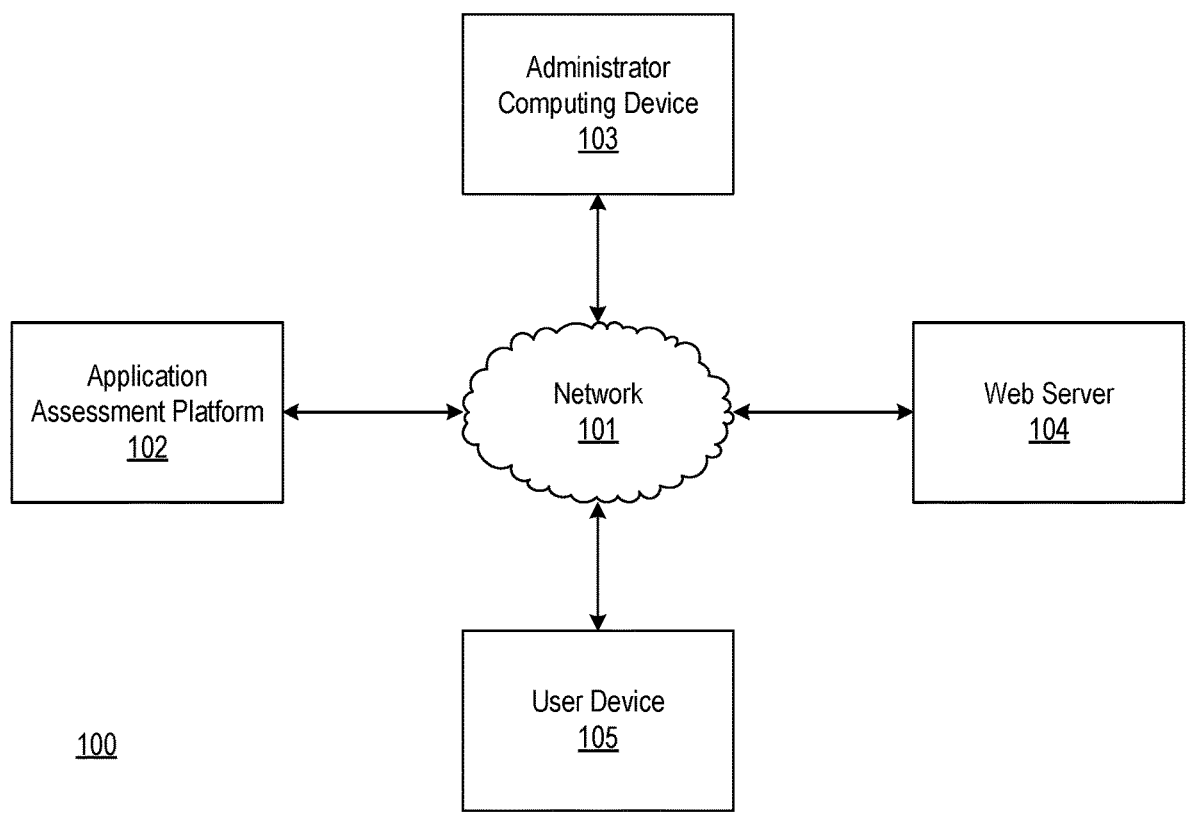
FIGS. 1A-1B depict an illustrative computing environment for implementing a content tree for application assessment in accordance with one or more example embodiments.
Figure 1B:
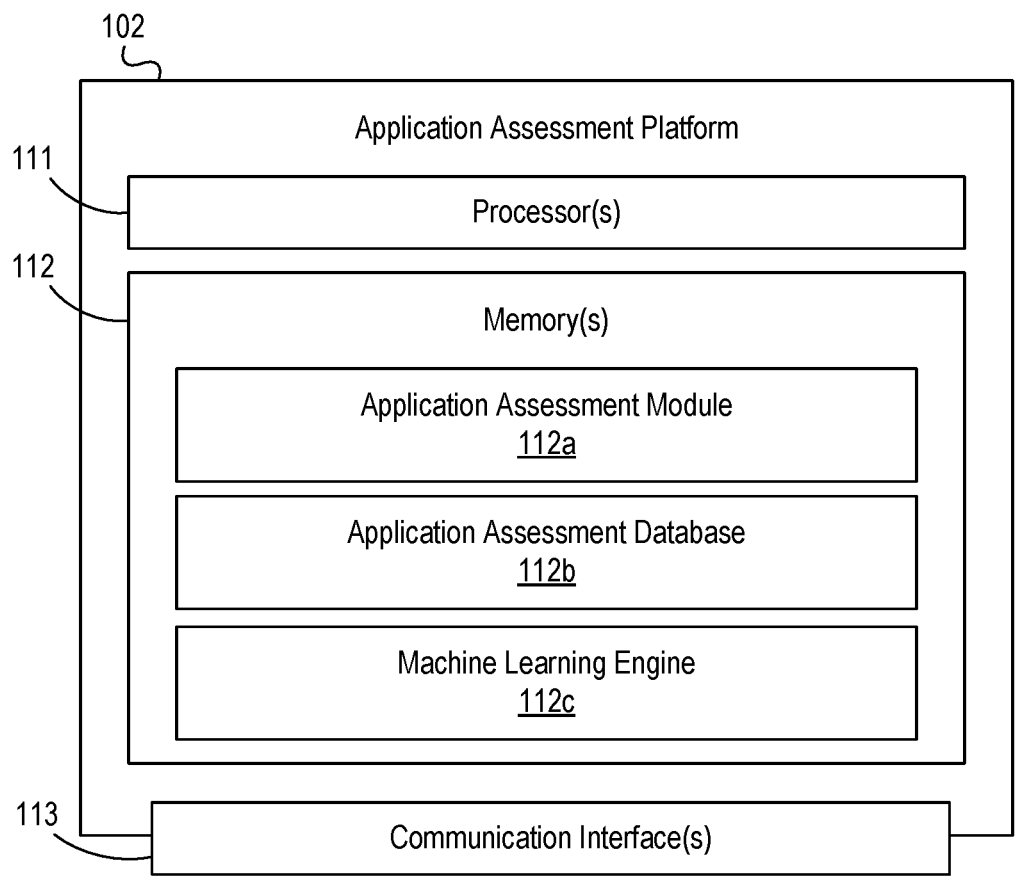

FIGS. 1A-1B depict an illustrative computing environment that implements a content tree for application assessment in accordance with one or more example embodiments. Referring to FIG. 1A, computing environment 100 may include one or more computer systems. For example, computing environment 100 may include an application assessment platform 102, an administrator computing device 103, a web server 104, and a user device 105.

As described further below, application assessment platform 102 may be a computer system that includes one or more computing devices (e.g., servers, server blades, or the like) and/or other computer components (e.g., processors, memories, communication interfaces) that may be used to host and maintain one or more content trees for application assessment. For example, the application assessment platform 102 may be configured to maintain one or more content trees that indicate parent-child page relationships between one or more content pages, and may be used to automatically validate such parent-child relationships. In some instances, the application assessment platform 102 may be an independent computing system (which may be local, cloud-based, or otherwise configured). In other instances, the application assessment platform 102 may be integrated into another computing system (e.g., administrator computing device 103, web server 104, user device 105, or another system).

Administrator computing device 103 may be a laptop computer, desktop computer, mobile device, tablet, smartphone, or the like that may be used by an individual such as a network or system administrator for an enterprise organization maintaining a website, mobile application, and/or other hierarchical content. For example, administrator computing device 103 may be used to initiate one or more application assessments and/or display results of the application assessments (e.g., display detected errors and/or other results). In some instances, administrator computing device 103 may be configured to display one or more user interfaces (e.g., test initiation interfaces, error interfaces, and/or other interfaces).

Web server 104 may be or include one or more computing devices (servers, server blades, or the like) that may be configured to host or otherwise maintain hierarchical content such as a web page, mobile application, and/or other content. In some instances, the web server 104 may be configured to communicate with one or more computing devices (e.g., user device 105) to cause display of the hierarchical content.

User device 105 may be a laptop computer, desktop computer, mobile device, tablet, smartphone, or the like that may be used by an individual to access a mobile application, web content, and/or other hierarchical content. In some instances, user device 105 may be configured to display one or more user interfaces (e.g., application interfaces, web interfaces, and/or other interfaces).

Computing environment 100 also may include one or more networks, which may interconnect application assessment platform 102, administrator computing device 103, web server 104, and/or user device 105. For example, computing environment 100 may include a network 101 (which may interconnect, e.g., chain of application assessment platform 102, administrator computing device 103, web server 104, and/or user device 105).

In one or more arrangements, application assessment platform 102, administrator computing device 103, web server 104, and/or user device 105 may be any type of computing device capable of sending and/or receiving requests and processing the requests accordingly. For example, application assessment platform 102, administrator computing device 103, web server 104, user device 105, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of application assessment platform 102, administrator computing device 103, web server 104, user device 105, may, in some instances, be special-purpose computing devices configured to perform specific functions.

Referring to FIG. 1B, application assessment platform 102 may include one or more processors 111, memory 112, and communication interface 113. A data bus may interconnect processor 111, memory 112, and communication interface 113. Communication interface 113 may be a network interface configured to support communication between application assessment platform 102 and one or more networks (e.g., network 101, or the like). Memory 112 may include one or more program modules having instructions that when executed by processor 111 cause application assessment platform 102 to perform one or more functions described herein and/or one or more databases that may store and/or otherwise maintain information which may be used by such program modules and/or processor 111. In some instances, the one or more program modules and/or databases may be stored by and/or maintained in different memory units of application assessment platform 102 and/or by different computing devices that may form and/or otherwise make up application assessment platform 102. For example, memory 112 may have, host, store, and/or include application assessment module 112a, application assessment database 112b, and a machine learning engine 112c.

Application assessment module 112a may have instructions that direct and/or cause application assessment platform 102 to generate content trees that may be used for application assessment, as discussed in greater detail below. Application assessment database 112b may store information used by application assessment module 112a and/or application assessment platform 102 in application of advanced techniques to assess applications, and/or in performing other functions. Machine learning engine 112c may have instructions that direct and/or cause the application assessment platform 102 to set, define, and/or iteratively refine optimization rules and/or other parameters used by the application assessment platform 102 and/or other systems in computing environment 100.

Figure 2A:
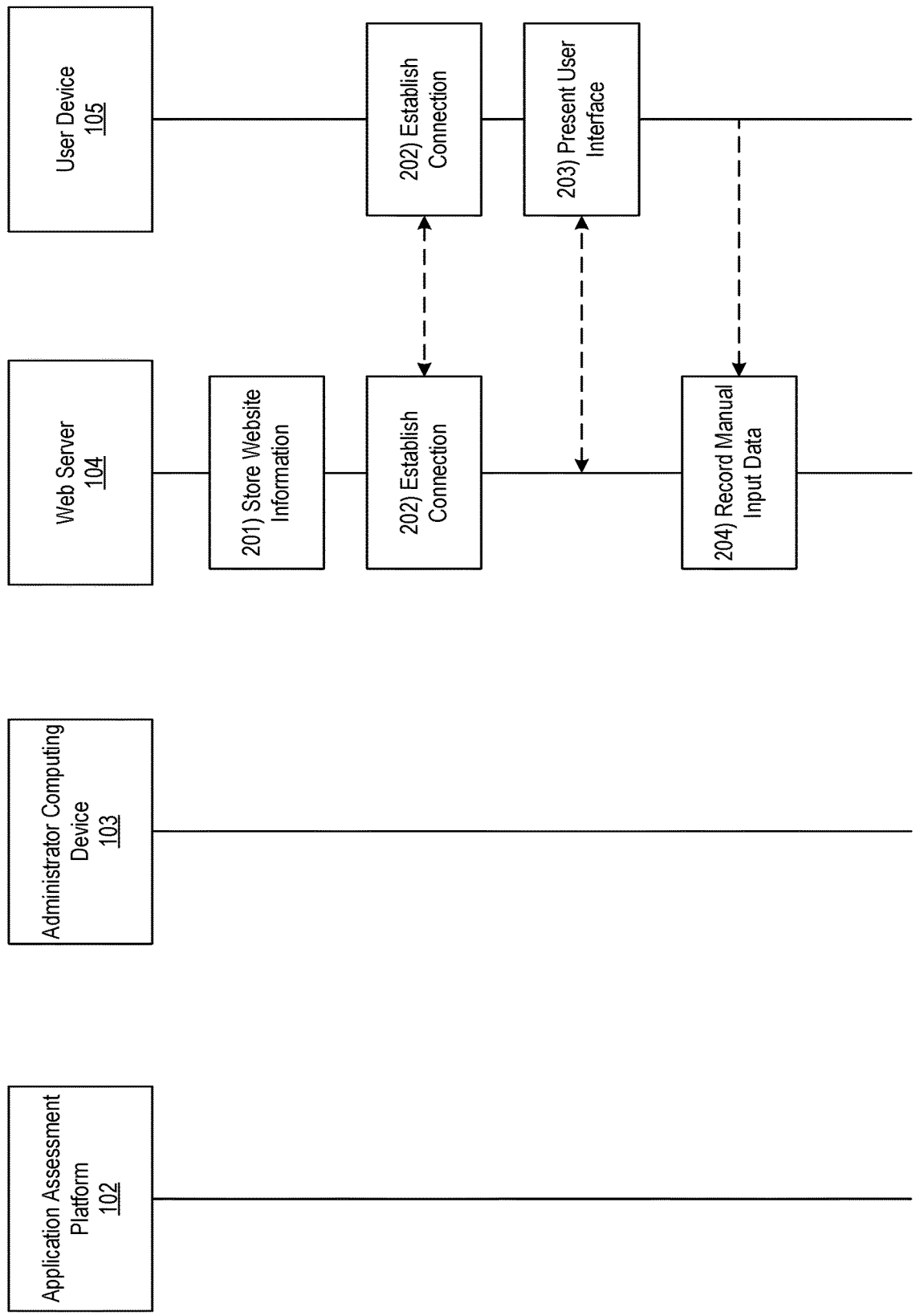
FIGS. 2A-2D depict an illustrative event sequence for implementing a content tree for application assessment in accordance with one or more example embodiments.

FIGS. 2A-2D depict an illustrative event sequence implementing a content tree for application assessment in accordance with one or more example embodiments. Referring to FIG. 2A, at step 201, the web server 104 may store website information. For example, the web server 104 may store one or more web pages that may be affiliated with a particular website. In some instances, these web pages may be related through one or more parent child relationships (e.g., a link on a parent page may be used to access the child page).

At step 202, the web server 104 may establish a connection with user device 105. For example, the web server 104 may establish a first wireless data connection with the user device 105 to link the web server 104 to the user device 105 (e.g., in preparation for causing display of user interfaces at the user device 105). In some instances, the web server 104 may identify whether or not a connection is already established with the user device 105. If connection is already established with the user device 105, the web server 104 might not re-establish the connection. If a connection is not yet established with the user device 105, the web server 104 may establish the first wireless data connection as described herein.

At step 203, the user device 105 may obtain the website information (or a portion of the website information) from the web server, and may use the website information to generate and/or display a user interface corresponding to the website (e.g., a web interface). In some instances, in presenting the user interface, the user device 105 may present a graphical user interface corresponding to an online banking portal, mobile banking application, and/or other interface that may include hierarchical content (e.g., content that includes one or more links to parent and/or child pages).

At step 204, the web server 104 may record manual input data collected at the user device 105. For example, a user may manually enter data that allows him or her to progress through a series of web interfaces, and the web server 104 may record this manual data so as to enable automated progression through the web interfaces (e.g., because the stored manual input data may be automatically input into various fields without further manual input). As an example, an interface may indicate one or more mandatory data input fields such as input address, name, and/or other information, and the web server 104 may record the manual input data as it is input by a user.

Figure 2B:
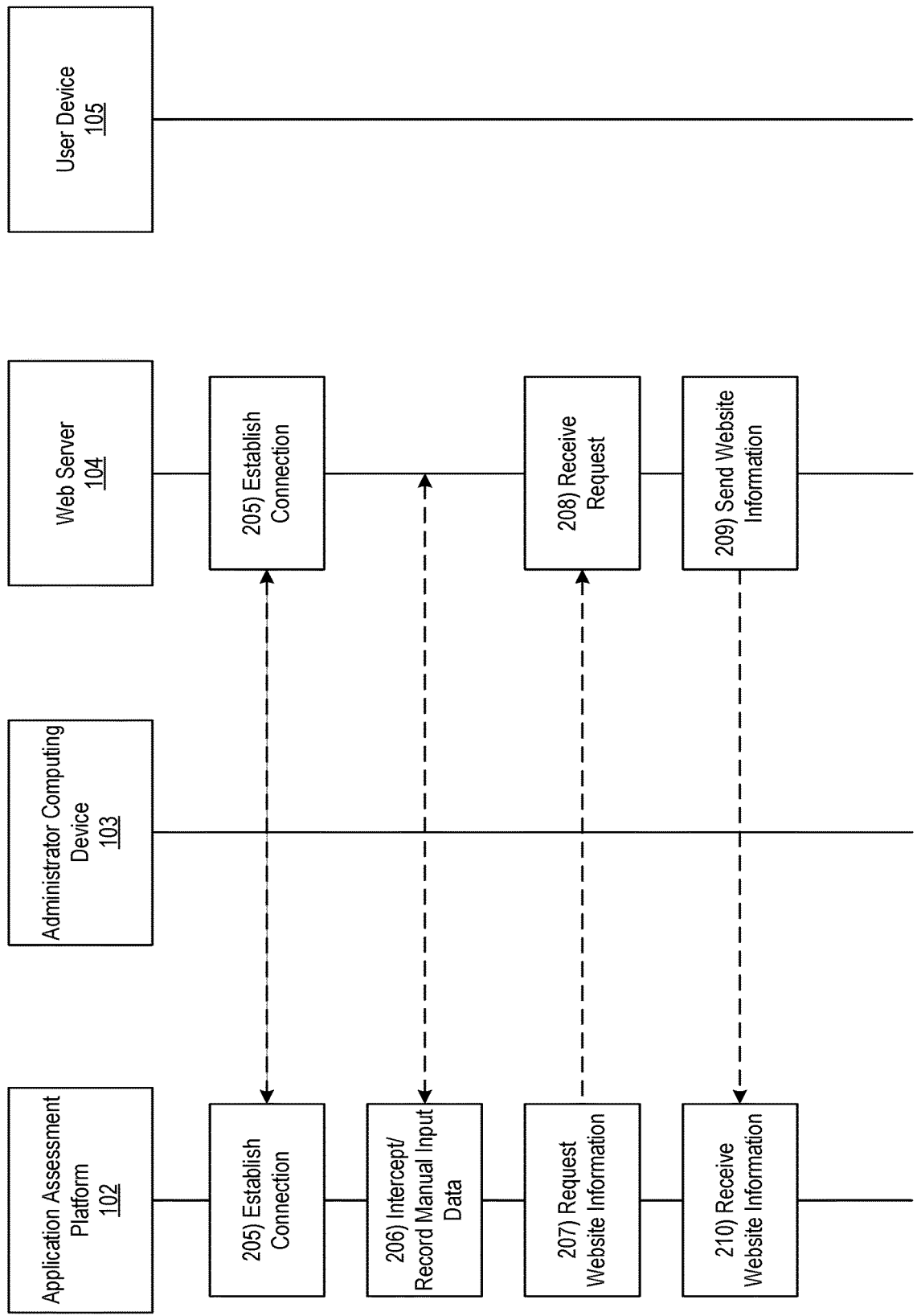

Referring to FIG. 2B, at step 205, the application assessment platform 102 may establish a connection with the web server 104. For example, the application assessment platform 102 may establish a second wireless data connection with the user device 105 to link the application assessment platform 102 to the user device 105 (e.g., in preparation for intercepting the manual input data from the web server 104). In some instances, the application assessment platform 102 may identify whether or not a connection is already established with the web server 104. If a connection is already established with the web server 104, the application assessment platform 102 might not re-establish the connection. If a connection is not yet established with the web server 104, the application assessment platform 102 may establish the second wireless data connection as described herein.

At step 206, the application assessment platform 102 may intercept and record the manual input data collected at step 204. For example, the application assessment platform 102 may intercept the manual input data as it is collected on the user device 105 and before it reaches the web server 104. In some instances, the application assessment platform 102 may be an optimization layer that runs on top of the web server 104. In some instances, the application assessment platform 102 may intercept/record the manual input data while the user is accessing the website (or other hierarchical content).

At step 207, the application assessment platform 102 may request the website information (e.g., content information) from the web server 104. For example, the application assessment platform 102 may request information indicating one or more parent-child page relationships that support websites hosted by the web server 104 (e.g., which may e.g., be affiliated with the user interfaces presented at step 203). In some instances, the application assessment platform 102 may request the website information via the communication interface 113 and while the second wireless data connection is established.

At step 208, the web server 104 may receive the request for website information. For example, the web server 104 may receive the request for website information while the second wireless data connection is established.

At step 209, the web server 104 may send the website information to the application assessment platform 102. For example, the web server 104 may send the website information to the application assessment platform 102 while the second wireless data connection is established.

At step 210, the application assessment platform 102 may receive the website information sent at step 209. For example, the application assessment platform 102 may receive the website information via the communication interface 113 and while the second wireless data connection is established. In some instances, the application assessment platform 102 may receive the website/content information while the user is accessing the website (or other hierarchical content).

Figure 2C:
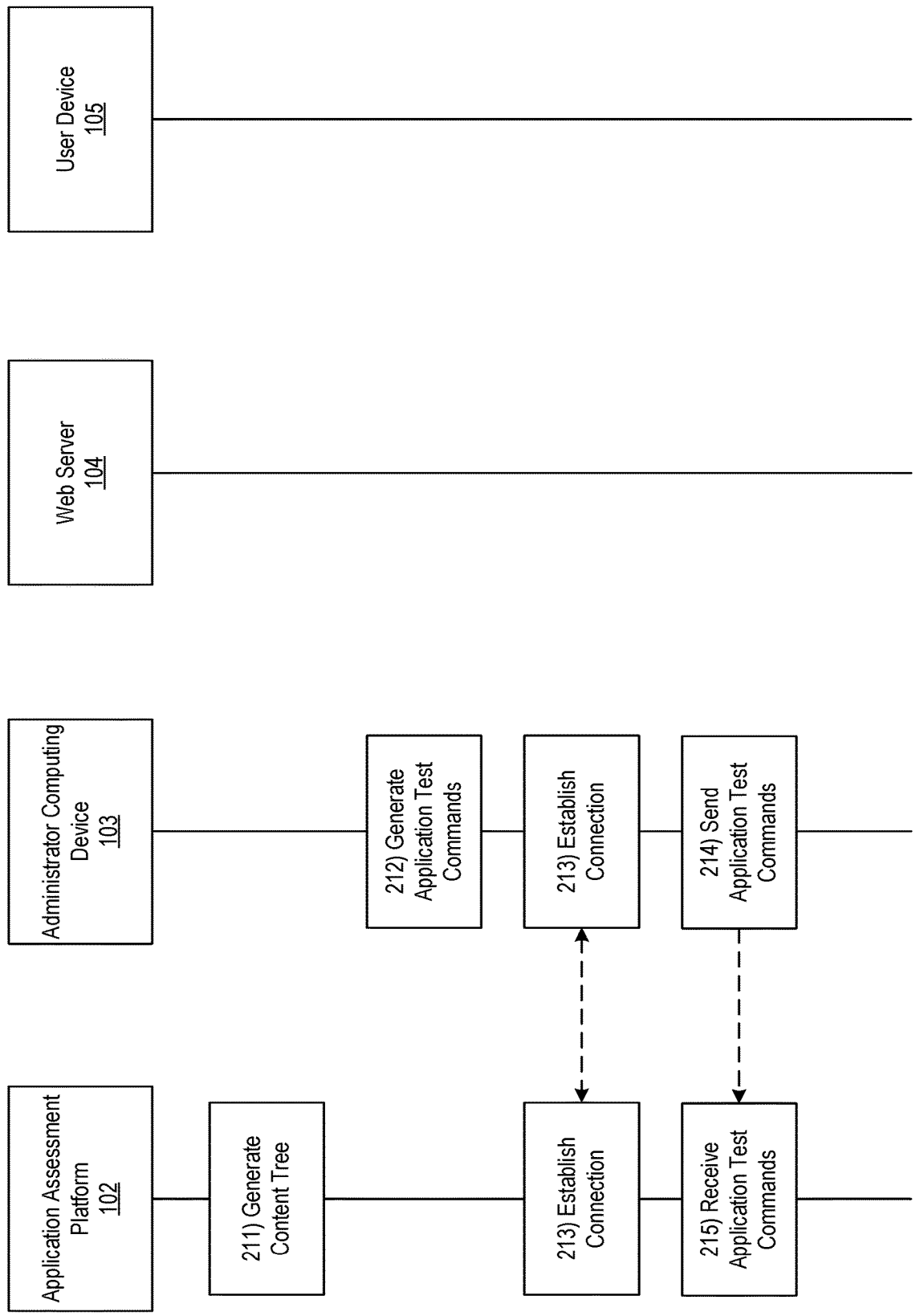

Referring to FIG. 2C, at step 211, the application assessment platform 102 may generate a content tree based on the website information. For example, the application assessment platform 102 may generate a content tree illustrating the parent-child relationships between various pages corresponding to a website (e.g., if a link is selected on the parent page, the website is navigated to the child page). In doing so, the application assessment platform 102 may establish a tree that may be used to identify intervening pages between an ultimate parent and an ultimate child page.

In some instances, to generate the content tree, the application assessment platform 102 may scan a main/home/ultimate parent page corresponding to the website/content information, and may register all hyperlinks accordingly. The application assessment platform 102 may then repeat this for all of the child pages and so on to create a tree of navigation parts that includes relations between various nodes (e.g., pages). In doing so, the application assessment platform 102 may generate the content tree without manual effort or further input. In some instances, in generating this content tree, the application assessment platform 102 may track pages being accessed by the user, and may include only these pages in the content tree. By doing so, the application assessment platform 102 may conserve computing resources by withholding from generating portions of the content tree that correspond to rarely (or never) accessed pages, and may further conserve memory by storing a smaller content tree (or set of content trees)

In some instances, the application assessment platform 102 may generate multiple versions of the content tree (e.g., for different device types, different geographic regions, and/or other varying characteristics). For instance, multiple versions of the content tree may be generated such that each of the multiple versions corresponds to a different or particular device type, different or particular geographic region, different or particular country, or the like. For example, certain device types may be configured to only display a subset of the hierarchical pages, and thus only this subset should be included in a version of the content tree for these devices. Similarly, certain hierarchical pages might not be displayed or available in different geographic regions (different countries, continents, states, or the like) and/or pages may be displayed in languages unique to the given geographic regions. Accordingly, only the corresponding subsets of pages should be included in these versions of the content tree for each region.

In some instances, the above described processes of collecting website/content information and generating the content tree may be periodically repeated using a periodic based assessment model, which may use one or more machine learning techniques to update the content tree based on new content or functionalities in real time. Accordingly, no further manual input may be needed to update the content tree, craft updated test cases, and/or perform other tasks.

At step 212, the administrator computing device 103 may generate one or more application test commands. For example, the administrator computing device 103 may automatically generate the commands or generate them based on user input. In either instance, the administrator computing device 103 may include, in the application test commands, a starting page and an ending page, and may direct the application assessment platform 102 to analyze parent-child relationships between the starting page and the ending page. For example, the administrator computing device 103 may display a graphical user interface similar to graphical user interface 405, which is shown in FIG. 4, and that includes data input fields for a starting directory and an ending directory.

At step 213, the administrator computing device 103 may establish a connection between the administrator computing device 103 and the application assessment platform 102. For example, the administrator computing device 103 may establish a third wireless data connection between the administrator computing device 103 and the application assessment platform 102 to link the administrator computing device 103 to the application assessment platform 102 (e.g., in preparation for sending the application test commands). In some instances, the administrator computing device 103 may identify whether or not a connection is already established with the application assessment platform 102. If a connection is already established with the application assessment platform 102, the administrator computing device 103 might not re-establish the connection. If a connection is not yet established with the application assessment platform 102, the administrator computing device 103 may establish the third wireless data connection as described herein.

At step 214, the administrator computing device 103 may send the one or more application test commands to the application assessment platform 102. For example, the administrator computing device 103 may send the one or more application test commands to the application assessment platform 102 while the third wireless data connection is established.

At step 215, the application assessment platform 102 may receive the one or more application test commands sent at step 214. For example, the application assessment platform 102 may receive the one or more application test commands via the communication interface 113 and while the third wireless data connection is established.

Figure 2D:
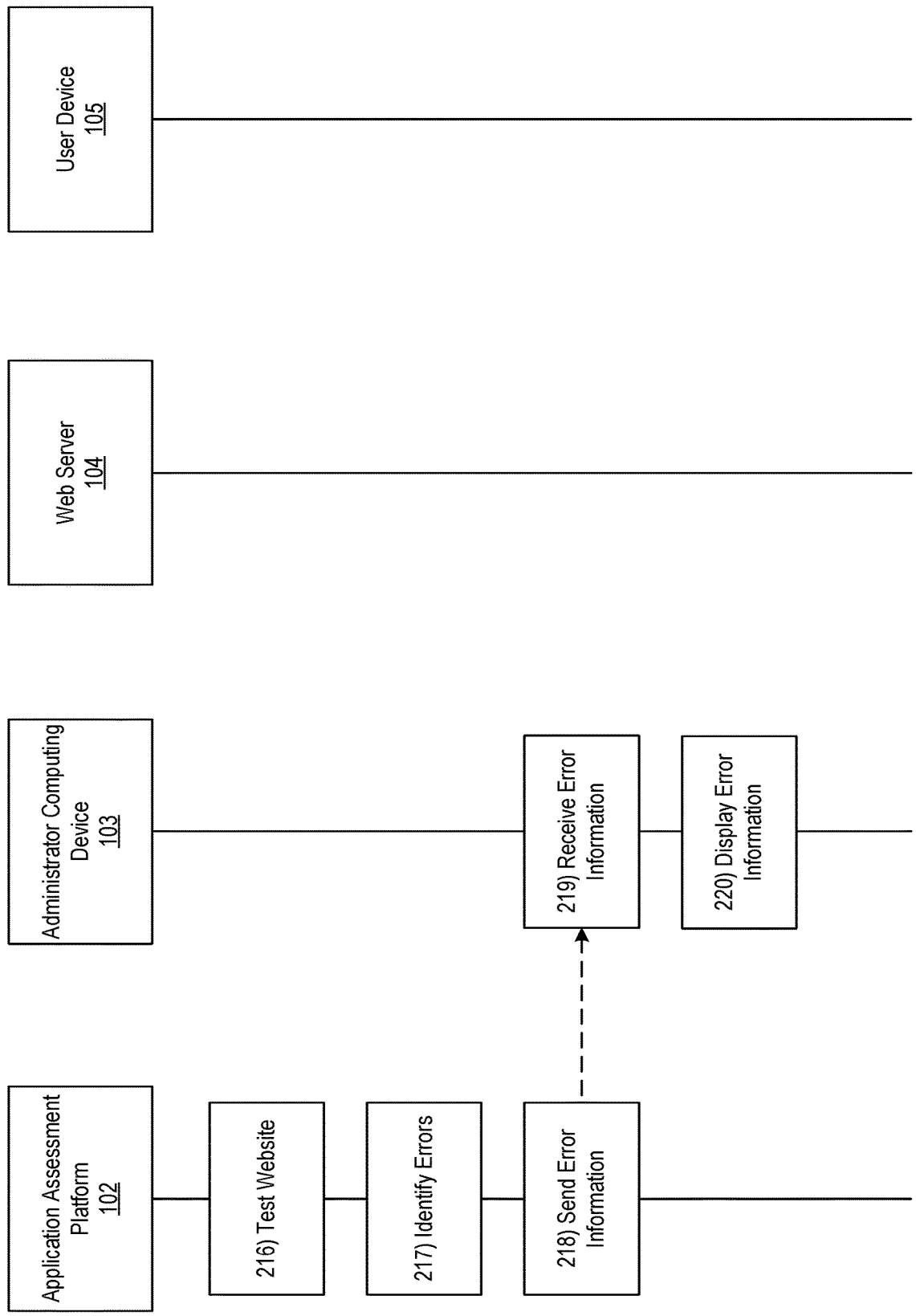

Referring to FIG. 2D, at step 216, based on or in response to the one or more application test commands, the application assessment platform 102 may test the website by analyzing parent-child relationships between the starting page and the ending page to identify whether or not any of the corresponding links cause an error (e.g., selection of a link on the parent page fails to cause navigation to the correct child page and/or selection of a link to a parent page from a child page fails to cause navigation to the correct parent page, as indicated in the content tree). In some instances, the application assessment platform 102 may populate one or more data input fields of the various pages between (and/or including) the starting page and the ending page with the manual input data, so as to progress between pages in a realistic manner (e.g., automatically populate an address field that requires completion before advancing to a subsequent page, and/or providing other information). In some instances, after analyzing the parent-child relationships between the starting page and the ending page specified by the administrator computing device 103, the application assessment platform 102 may analyze remaining parent-child relationships illustrated in the content tree (e.g., in testing the website, the application assessment platform 102 may perform a holistic error analysis of the website or other hierarchical content). In these instances, the application assessment platform 102 may analyze these remaining parent-child relationships without receiving additional application assessment commands prompting the application assessment platform 102 to do so.

In some instances, the application assessment platform 102 may test the website or other hierarchical content based on or in response to receipt of a particular value (e.g., numeric, alphanumeric, or the like), which may have been generated by a range based random value generator. In some instances, this range based random value generator may be part of the application assessment platform 102 or another computing device/system. For example, the application assessment platform 102 may be configured to initiate a test whenever a value of 4 is received, and the range based random value generator may be configured to generate values between 1-10 (so a test would be initiated in response to roughly 10% of the values generated). In these instances, the range based random value generator may generate values at a predetermined interval (e.g., once per day, or other time interval). In some instances, the application assessment platform 102 may dynamically adjust the values for which a test should be initiated. For example, if a first number of errors have been identified during a given timeframe (e.g., 1 week, 1 month, or the like), a first value range may be used to initiate tests, whereas if a second number of errors have been identified during a given timeframe, a second value range may be used to initiate tests. As a particular example, if a first number of errors has been identified, the application assessment platform 102 may initiate a test in response to a single value, whereas if a second number of errors, larger than the first number of errors, has been identified, the application assessment platform 102 may initiate tests in response to a value range (thus effectively increasing the frequency at which tests are run).

In testing the website/hierarchical content in this way, the application assessment platform 102 may perform a holistic error analysis without executing manually generated test scripts, and without affecting a user experience associated with accessing the hierarchical content (this analysis may be running in the background while the user is viewing the corresponding content). For example, the application assessment platform 102 may assess the web site/hierarchical content in parallel with the user experience and in a way that is imperceptible (or otherwise not visible) to the user (these techniques may be implemented by instantiating an invisible instance of the application assessment software on a user device (e.g., user device 105)). In some instances, the described functions of the application assessment platform 102 may be integrated into a web browser, mobile application, and/or other software.

At step 217, the application assessment platform 102 may identify one or more errors identified through the testing performed at step 216. For example, the application assessment platform 102 may identify that one or more parent-child relationships were broken or otherwise flawed.

At step 218, the application assessment platform 102 may send error information to the administrator computing device 103 indicating the identified one or more errors. For example, the application assessment platform 102 may send the error information to the administrator computing device 103 via the communication interface 113 and while the third wireless data connection is established. In some instances, the application assessment platform 102 may also send one or more commands directing the administrator computing device 103 to display the error information.

In some instances, in addition or as an alternative to notifying the administrator computing device 103 of the one or more errors, the application assessment platform 102 may automatically repair/correct the one or more errors. In some instances, after repairing and/or notifying the administrator computing device of the one or more errors, the application assessment platform 102 may continue to validate the web page/hierarchical content using the methods described above, and may further correct any subsequently identified errors.

At step 219, the administrator computing device 103 may receive the error information sent at step 218. For example, the administrator computing device 103 may receive the error information while the third wireless data connection is established. In some instances, the administrator computing device 103 may also receive the one or more commands directing the administrator computing device 103 to display the error information.

At step 220, based on or in response to the one or more commands directing the administrator computing device 103 to display the error information, the administrator computing device 103 may display the error information. For example, the administrator computing device 103 may display a graphical user interface similar to graphical user interface 505 in FIG. 5, which may indicate a broken link on the website.

Although steps 201-220 as described above primarily refer to testing of a website, these steps may be performed to test any other software (e.g., a mobile application and/or other software) without departing from the scope of this disclosure. Furthermore, application assessment platform 102 is described as an independent computing platform, the application assessment platform 102 may instead be an optimization layer that sits on another computing device (e.g., administrator computing device 103, web server 104, user device 105, and/or other computing devices) and/or may be a cloud based system, without departing from the scope of the disclosure.

Figure 3:
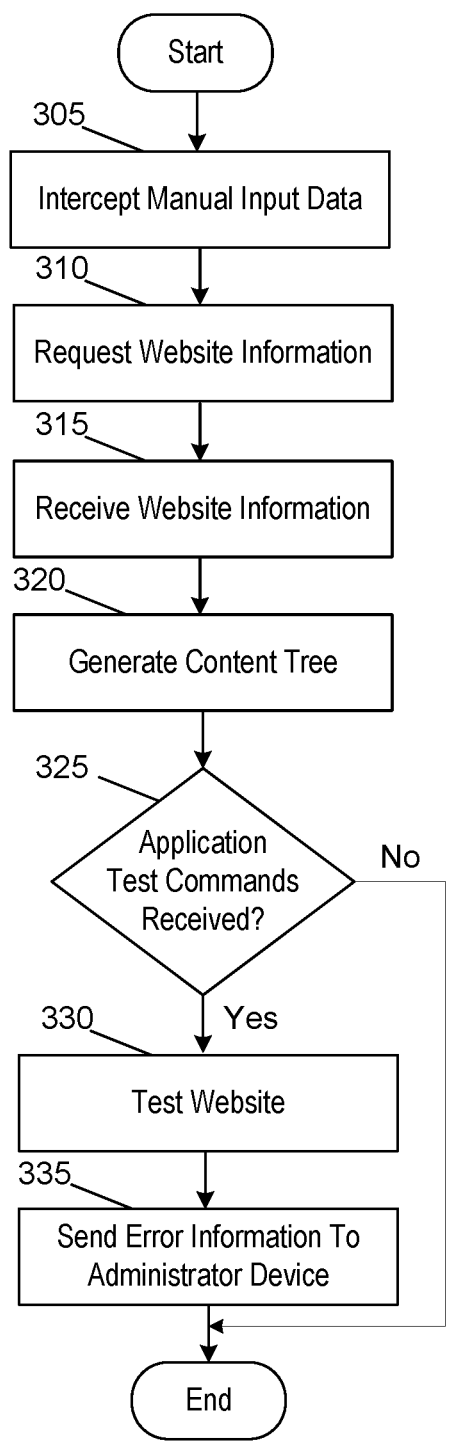
FIG. 3 depicts an illustrative method for implementing a content tree for application assessment in accordance with one or more example embodiments.

FIG. 3 depicts an illustrative method for implementing a content tree for application assessment in accordance with one or more example embodiments. Referring to FIG. 3, at step 305, a computing platform having at least one processor, a communication interface, and memory may intercept manual input data. At step 310, the computing platform may request website information from a web server. At step 315, the computing platform may receive the website information. At step 320, the computing platform may generate a content tree using the website information. At step 325, the computing platform may identify whether or not application test commands have been received. If application test commands have not been received, the method may end. If application test commands have been received, the method may proceed to step 330.

At step 330, the computing platform may test the website corresponding to the website information. At step 335, the computing platform may send error information to an administrator device.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   establish a content tree indicating relationships between pages of hierarchical content;
   using the content tree and in response to receipt of one or more application assessment commands, generate error information based on a starting page and an ending page, wherein generating the error information comprises performing a holistic error analysis of the hierarchical content between the starting page and the ending page, wherein performing the holistic error analysis of the hierarchical content between the starting page and the ending page includes automatically populating one or more manual input fields using manual input data, and wherein performing the holistic error analysis of the hierarchical content between the starting page and the ending page is further in response to receipt of a particular value, generated by and received from a range based random value generator; and
   send, to an administrator computing device, the error information and one or more commands to display an error notification based on the error information, wherein sending the one or more commands to display the error notification based on the error information causes the administrator computing device to display the error notification.

2. The computing platform of claim 1, wherein the memory stores additional computer readable instructions that, when executed by the at least one processor, further cause the computing platform to:
   receive, from a web server and while a user device is accessing the hierarchical content, content information and manual input data corresponding to the hierarchical content, wherein the content tree is established using the content information.

3. The computing platform of claim 1, wherein the memory stores additional computer readable instructions that, when executed by the at least one processor, further cause the computing platform to:
   receive, from the administrator computing device:
   the starting page of the hierarchical content,
   the ending page of the hierarchical content, and
   the one or more application assessment commands.

4. The computing platform of claim 1, wherein establishing the content tree further comprises:
   establishing multiple versions of the content tree, wherein each of the multiple versions of the content tree corresponds to a particular type of device.

5. The computing platform of claim 1, wherein establishing the content tree further comprises:
   establishing multiple versions of the content tree, wherein each of the multiple versions of the content tree corresponds to a particular region.

6. The computing platform of claim 1, wherein establishing the content tree further comprises:
   establishing multiple versions of the content tree, wherein each of the multiple versions of the content tree corresponds to a particular country.

7. The computing platform of claim 1, wherein the hierarchical content comprises a web page.

8. The computing platform of claim 1, wherein the hierarchical content comprises a mobile application.

9. The computing platform of claim 8, wherein performing the holistic error analysis further comprises analyzing, without receiving additional application assessment commands and after analyzing the hierarchical content between the starting page and the ending page, remaining parent child relationships comprising the hierarchical content.

10. The computing platform of claim 1, wherein performing the holistic error analysis comprises identifying whether or not links between parent and child pages of the hierarchical content are correctly established.

11. The computing platform of claim 1, wherein the holistic error analysis is performed without executing manually generated test scripts and without affecting a user experience associated with accessing the hierarchical content.

12. The computing platform of claim 1, wherein the memory stores further instructions that, when executed by the at least one processor, cause the computing platform to:
   identify a number of errors included in the error information;
   compare the number of errors to a threshold error value;
   based on identifying that the number of errors exceeds the threshold error value, dynamically adjust a range for the range based random value generator by reducing the range to increase testing frequency; and
   based on identifying that the number of errors does not exceed the threshold error value, dynamically adjust the range for the range based random value generator by increasing the range to reduce testing frequency.

13. A method comprising:

at a computing platform comprising at least one processor, a communication interface, and memory:

establishing a content tree indicating relationships between pages of hierarchical content;

using the content tree and in response to receipt of one or more application assessment commands, generating error information based on a starting page and an ending page, wherein generating the error information comprises performing a holistic error analysis of the hierarchical content between the starting page and the ending page, wherein performing the holistic error analysis of the hierarchical content between the starting page and the ending page includes automatically populating one or more manual input fields using manual input data, and wherein performing the holistic error analysis of the hierarchical content between the starting page and the ending page is further in response to receipt of a particular value, generated by and received from a range based random value generator; and sending, to an administrator computing device, the error information and one or more commands to display an error notification based on the error information, wherein sending the one or more commands to display the error notification based on the error information causes the administrator computing device to display the error notification.

14. The method of claim 13, wherein establishing the content tree further comprises:

establishing multiple versions of the content tree, wherein each of the multiple versions of the content tree corresponds to a particular type of device.

15. The method of claim 13, wherein establishing the content tree further comprises:

establishing multiple versions of the content tree, wherein each of the multiple versions of the content tree corresponds to a particular region.

16. The method of claim 13, wherein establishing the content tree further comprises:

establishing multiple versions of the content tree, wherein each of the multiple versions of the content tree corresponds to a particular country.

17. The method of claim 13, wherein the hierarchical content comprises a web page.

18. The method of claim 13, wherein the hierarchical content comprises a mobile application.

19. The method of claim 13, wherein performing the holistic error analysis comprises identifying whether or not links between parent and child pages of the hierarchical content are correctly established.

20. One or more non-transitory computer-readable media storing instructions that, when executed by a computing platform comprising at least one processor, a communication interface, and memory, cause the computing platform to:

establish a content tree indicating relationships between pages of hierarchical content;

using the content tree and in response to receipt of one or more application assessment commands, generate error information based on a starting page and an ending page, wherein generating the error information comprises performing a holistic error analysis of the hierarchical content between the starting page and the ending page, wherein performing the holistic error analysis of the hierarchical content between the starting page and the ending page includes automatically populating one or more manual input fields using manual input data, and wherein performing the holistic error analysis of the hierarchical content between the starting page and the ending page is further in response to receipt of a particular value, generated by and received from a range based random value generator; and send, to an administrator computing device, the error information and one or more commands to display an error notification based on the error information, wherein sending the one or more commands to display the error notification based on the error information causes the administrator computing device to display the error notification.

\* \* \* \* \*

UNITED STATES PATENT AND TRADEMARK OFFICE
CERTIFICATE OF CORRECTION

PATENT NO. : 11,663,071 B2
APPLICATION NO. : 17/728046
DATED : May 30, 2023
INVENTOR(S) : Curtokar et al.

Page 1 of 1

It is certified that error appears in the above-identified patent and that said Letters Patent is hereby corrected as shown below:

On the Title Page

Page 2, Column 2, Item (56) Other Publications, Line 1:
Delete "Hollistic" and insert --Holistic-- therefor Page 2, Column 2, Item (56) Other Publications, Line 2:
Delete "Probabillisic" and insert --Probabilistic-- therefor Signed and Sealed this
Twenty-sixth Day of March, 2024

Katherine Kelly Vidal
*Director of the United States Patent and Trademark Office*